(12) United States Patent
Schneider et al.

(10) Patent No.: US 6,673,398 B2
(45) Date of Patent: Jan. 6, 2004

(54) ALIGNMENT OF LYOTROPIC CHROMONIC LIQUID CRYSTALS AT SURFACES AS MONOLAYERS AND MULTILAYERED STACKS

(75) Inventors: Tod Schneider, Kent, OH (US); Oleg D. Lavrentovich, Kent, OH (US)

(73) Assignee: Kent State University, Kent, OH (US)

( * ) Notice: Subject to any disclaimer, the term of this patent is extended or adjusted under 35 U.S.C. 154(b) by 39 days.

(21) Appl. No.: 09/855,054

(22) Filed: May 14, 2001

(65) Prior Publication Data

US 2002/0168511 A1 Nov. 14, 2002

(51) Int. Cl.$^7$ .............................................. C09K 19/04
(52) U.S. Cl. ........................ 428/1.2; 349/86; 349/123; 349/126; 349/127; 349/193
(58) Field of Search ..................... 428/323, 1.2; 349/86, 349/123, 126, 127, 193

(56) References Cited

U.S. PATENT DOCUMENTS

| | | | |
|---|---|---|---|
| 2,232,539 A | 2/1941 | Langmuir | |
| 4,370,194 A | 1/1983 | Shaver et al. ................ | 156/643 |
| 5,328,714 A | * | 7/1994 | Nakajima et al. |
| 5,596,434 A | 1/1997 | Walba et al. | |
| 6,034,758 A | 3/2000 | Petera et al. ................. | 349/143 |
| 6,049,428 A | 4/2000 | Khan et al. ................... | 359/491 |
| 6,054,190 A | * | 4/2000 | Ogawa et al. |
| 6,106,948 A | * | 8/2000 | Wang et al. |
| 6,171,802 B1 | 1/2001 | Woolverton et al. | |
| 6,180,295 B1 | 1/2001 | Helber et al. .................. | 430/20 |
| 6,284,197 B1 | 9/2001 | Abbott et al. ............. | 422/82.05 |
| 6,395,354 B1 | * | 5/2002 | Sahouani et al. |
| 6,399,166 B1 | 6/2002 | Khan et al. ................. | 428/1.31 |
| 6,411,354 B1 | * | 6/2002 | Laverntovich et al. |

FOREIGN PATENT DOCUMENTS

| | | |
|---|---|---|
| WO | WO 98/31772 | 7/1998 |
| WO | WO 99/63329 | 12/1999 |
| WO | WO 99/64862 | 12/1999 |

OTHER PUBLICATIONS

Gupta et al., *Optical Amplification of Ligand–Receptor Binding Using Liquid Crystals*, Science, American Association for the Advancement of Science, vol. 279, pp. 2077–2080 (1998).

*Handbook of Liquid Crystals*, (Wiley–VCH, Weinheim, 1998) vol 2B, Chapter XVIII—Chromonics by Lydon, pp. 981.

Sergan et al., *Polarizing–alignment layers for twisted nematic cells*, Liquid Crystals, vol. 27, No. 5, pp. 567–572 (May, 2000).

Lee and Labes, *Lyotropic Cholesteric and Nematic Phases of Disodium Cromoglycate in Magnetic Fields*, Mol. Cryst. Liq. Cryst., vol. 84, pp. 137–157 (1982).

(List continued on next page.)

*Primary Examiner*—H. Thi Le

(57) ABSTRACT

A broad class of lyotropic liquid crystals of a non-surfactant nature, the so-called lyotropic chromonic liquid crystals (LCLCs), are alignable with the techniques, in particular, LCLCs can be aligned at a surface as one monomolecular layer as a stack of monomolecular layers. The method for monolayer alignment is based on alternate layer-by-layer adsorption of polyions and dyes from aqueous solutions that have liquid crystalline structure. Using this method, one is able to stack alternate monolayers of dye and polyion while controlling the long-range in-plane orientation of the dye molecules within the plane of each layer. The feature of controlling the alignment of LCLCs enables one to create practical devices from them. For example, alignment of multilayered stacks allows one to use the resulting dried LCLC films in optical devices, for example, as internal polarizers, color filters, optical compensators, band-gap filters, and the like.

32 Claims, 12 Drawing Sheets

OTHER PUBLICATIONS

R. K. Iler, *Multilayers of Colloidal Particles*, Journal of Colloid and Interface Science, 21, pp. 569–594.

Decher et al., *Buildup of ultrathin multilayer films by a self–assembly process: II. Consecutively alternating adsorption of anionic and cationic polyelectrolytes on charged surfaces*, Thin Solid Films, 210/211, pp. 831–835 (1992).

Decher et al., *Proof of multilayer structural organization in self–assembled polycation–polyanion molecular films*, Thin Solid Films, 244, p. 772–777 (1994).

Lui et al., *Two–Dimensional Aggregation of a Long–Chain Thiacarbocyanin Dye Monolayer on Polyanion Subphases*, J. Phys. Chem., 100, pp. 20138–20142 (1996).

Lvov et al., *Assembly of Multicomponent Protein Films by Means of Electrostatic Layer–by–Layer Adsorption*, J. Am. Chem. Soc., 117, pp. 6117–6123 (1995).

Lvov et al., *Molecular film assembly via layer–by–layer adsorption of oppositely charged macromolecules (linear polymer, protein and clay) and concanavalin A and glycogen*, Thin Solid Films, 284–285, 797–801 (1996).

Ariga et al., *Assembling Alternate Dye—Polyion Molecular Films by Electrostatic Layer–by–layer Adsorption*, J. Am. Chem. Soc., 119, 2224–2231 (1997).

Lvov et al., *Alternate Assembly of Ordered Multilayers of $SiO_2$ and Other Nanoparticles and Polyions*, Langmuir, 13, 6195–6203 (1997).

Lvov et al., *Ultrathin films of charged polysaccharides assembled alternately with liner polyions*, J. Biomater. Sci. Polymer Edn., 9, No. 4, pp. 345–355 (1998).

T.L. Morkved, et al., *Local Control of Microdomain Orientation in Diblock Copolymers Thin Films With Electric Fields*, Science 273, 931 (Aug., 1996).

Schmidt et al., *Shear Orientation of Lyotropic Hexagonal Phases*, J. Phys. Chem. B., 102, pp. 507–513 (1998).

Schneider et al., *Self–Assembled Monolayers and Multilayered Stacks of Lyotropic Chromonic Liquid Crystalline Dyes with In–Plane Orientational Order*, Langmuir, vol. 16, pp. 5227–5230 (May 16, 2000).

Ichimura et al., *Photoimages Formed by Lyotropic Liquid Crystals*, Chemistry Letters 2000 (Sep. 2000), pp. 1022–1023.

* cited by examiner

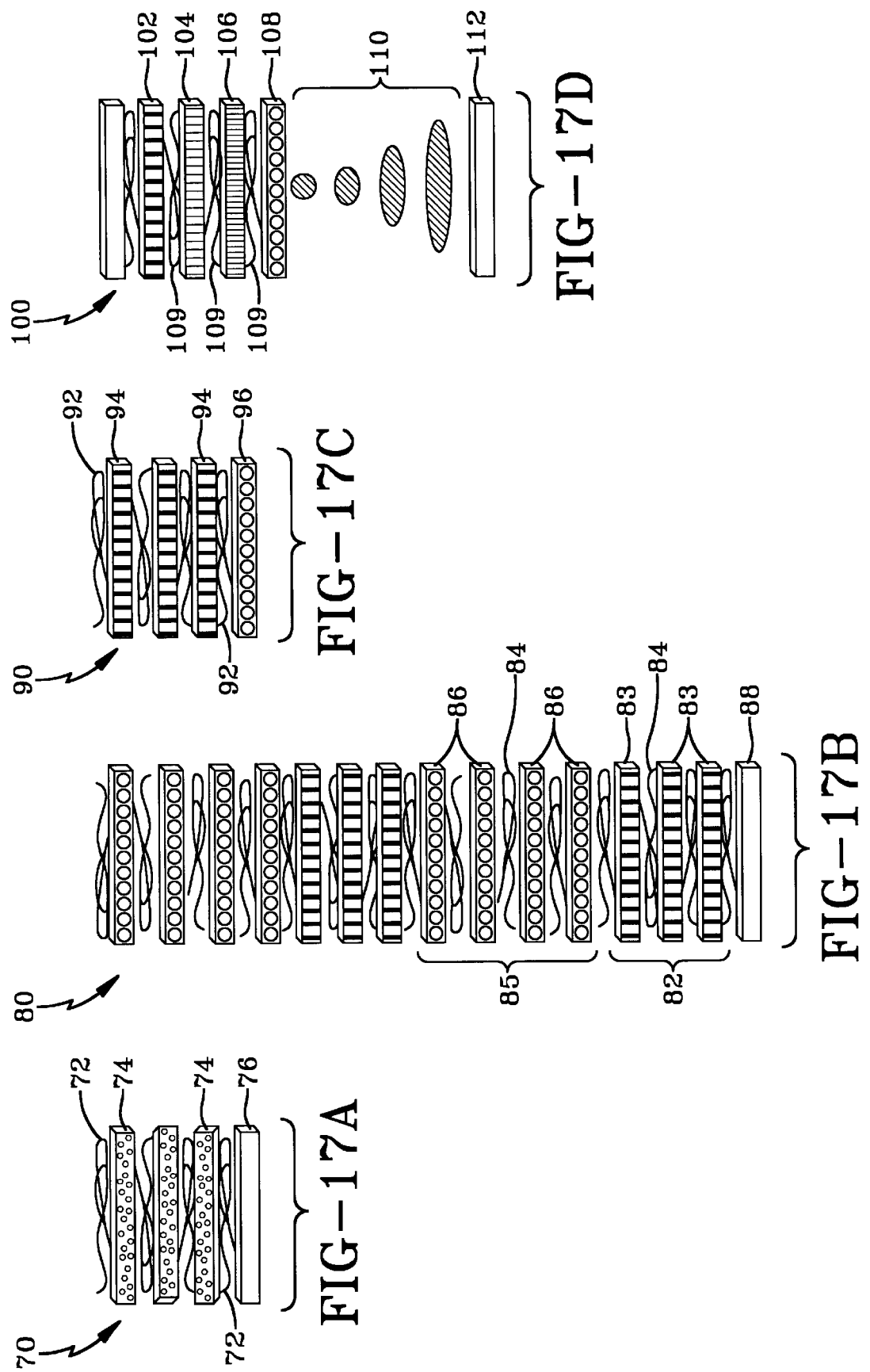

ALIGNMENT OF LYOTROPIC CHROMONIC LIQUID CRYSTALS AT SURFACES AS MONOLAYERS AND MULTILAYERED STACKS

TECHNICAL FIELD

This invention relates to a structure and method by which lyotropic chromonic liquid crystals are aligned at a surface as one monomolecular layer or as a stack of individual molecular layers, each layer possessing long-range in-plane orientational order.

BACKGROUND ART

Liquid crystals are traditionally classified into thermotropic and lyotropic types. Thermotropic materials acquire their mesomorphic (orientationally ordered) state when the material is within a certain temperature range. Lyotropic materials become mesomorphic when dissolved in some solvent (such as water), within an appropriate concentration range.

Alignment of thermotropic liquid crystals is an active area of current research and development. Usually, the alignment technique is based on a special unidirectional treatment of the plates or substrates that bound the liquid crystalline material. An example technique is disclosed in U.S. Pat. No. 5,596,434 entitled "Self-Assembled Monolayers For Liquid Crystal Alignment." The '434 patent discloses that the plates are covered with a polymer layer which is mechanically rubbed. The direction of rubbing sets the direction of orientation of the liquid crystal, i.e., the director, at the substrate, as a result of anisotropic molecular interactions at the interface. The phenomenon of orienting action between the anisotropic (rubbed, for example) substrate and the liquid crystalline alignment is called "anchoring." Alignment by surface anchoring is a standard means of alignment in liquid crystalline displays. Surfaces are typically treated with a polymer or a surfactant in order to obtain the desired alignment effects. The methods of alignment are well established for thermotropic liquid crystals but are not necessarily applicable to lyotropic liquid crystals because of the differences in the molecular structure between the two classes of liquid crystals.

Lyotropic liquid crystals are more difficult to align in the plane of the substrate than their thermotropic counterparts. The reason is that most lyotropic liquid crystals are based on amphiphilic materials (surfactants) dissolved in water or oil. Amphiphilic molecules have a polar (hydrophilic) head and a non-polar (hydrophobic) aliphatic tail. When surfactant molecules are in contact with a substrate, their amphiphilic nature generally results in a perpendicular orientation of the molecule with respect to the plane of the substrate. Either the polar head or the hydrophobic tail of the molecule is attracted to the polar or non-polar bounding plate, which results in the perpendicular alignment of the molecule with respect to the substrate. Perpendicular alignment means that the preferred orientation is the so-called homeotropic alignment, in which the optical axis is perpendicular to bounding plates. However, it is very difficult, if possible at all, to align the surfactant-based liquid crystal in a planar fashion where the director is in the plane of the solid substrate.

There is a special class of lyotropic liquid crystal, called lyotropic chromonic liquid crystal (LCLC). The LCLC family embraces a range of dyes, drugs, nucleic adds, antibiotics, carcinogens, and anti-cancer agents. The molecular and macrostructure of LCLCs, as seen in FIG. 1B, are markedly different from that of conventional lyotropic liquid crystals based on amphiphilic rod-like molecules with polar heads and hydrophobic alkyl chain tails, also referred to as surfactants which are shown in FIG. 1A. LCLC molecules are believed to be plank-like rather than rod-like, rigid rather than flexible, aromatic rather than aliphatic. According to Lydon, the interaction of the aromatic cores is the main mechanism of molecular face-to-face stacking. Hydrophilic ionic groups at the periphery of the molecules make the material water-soluble. These materials have become a subject of intensive studies lately as it became clear that they can be used as internal polarizing elements in liquid crystal displays. These applications require a uniform alignment of LCLC materials with the director in the plane of the cell (Or slightly tilted). To achieve an in-plane alignment, Ichimura et al. suggested modifying the chemical composition of the LCLC by adding an unspecified non-ionic surfactant (0.4%–1% wt.). A photo-treated polymer is then used to align the mixture of surfactant and LCLC. In the present invention, we achieve alignment of LCLCs without modifying their composition with surfactants. The established art of aligning LCLCs in bulk solutions uses a strong magnetic field applied to the LCLC cell. Unfortunately, this field-induced alignment is only temporary as the degenerate (no fixed direction of molecular orientation) orientation returns within tens of minutes once the magnetic field is removed.

There are also known techniques for layer-by-layer electrostatic deposition of materials that form surface film alignments. Adsorption of charged colloidal particles on a layer-by-layer basis is a technique that was originally developed by Iler in 1965. The technique was expanded to include adsorption of anionic and cationic polyelectrolytes on a charged surface. In addition, this technique is very effective in investigating two-dimensional aggregation of dye monolayers on polyanion subphases. An extensive amount of work on creating stacked layers of proteins, dyes, $SiO_2$ nanoparticles, and charged polysaccharides on polyions has also been done. The basic concept consists of using oppositely charged materials to adsorb one layer onto the other alternately. The layer thickness is determined to be no more than a molecular layer due to the effective screening of ionic charges.

One of the challenges of self-assembly techniques is the control of in-plane orientation of microdomains. As noted above, in bulk samples, uniform alignment is achieved by using liquid crystal materials or by shear of polymer melts, but it is not clear how or even whether these methods can be applied to films of nanometer thickness. Morkved et al. has shown that the local control of orientation could be achieved by using a substrate with patterned electrodes. An in-plane electric field orients a dielectrically anisotropic material, for example, a block copolymer film. The oriented area between the electrodes cannot be much wider than few tens of micrometers since the electric field needed to align the structure increases with the separation distance between the electrodes.

In-plane orientation of a molecular monolayer has never been achieved in the known art using self-assembly of charged species. The idea of employing properties intrinsic to the liquid crystalline phase to create an oriented monolayer in Langmuir-Blodgett (LB) techniques has already been well-established. However with LB techniques, the short-range orientation is normal (perpendicular) to the film plane as the polar groups are either on the top (or the bottom) of the film with the non-polar tails on the opposite side as seen in FIG. 2. In addition, LB films are notoriously difficult to make uniformly over large areas and the molecules used in LB techniques generally exhibit a very low birefringence and little to no light absorption.

DISCLOSURE OF INVENTION

It is thus an aspect of the present invention to provide alignment of lyotropic chromonic liquid crystals at surfaces as monolayers.

It is another aspect of the present invention to provide a film on a substrate, wherein the substrate is treated to exhibit a desired polarity.

It is a further aspect of the present invention to provide a structure, as set forth above, wherein the film includes a polyion layer on the substrate, which may or may not be sheared, such that the polyion's polarity is attracted to the polarity of the substrate.

It is yet another aspect of the present invention to provide a structure, as set forth above, wherein the film includes a lyotropic chromonic liquid crystal layer disposed on the polyion layer, and wherein the lyotropic liquid crystal layer may or may not be sheared.

It is yet another aspect of the present invention to provide a structure, as set forth above, wherein the polarity of the lyotropic chromonic liquid crystal material is attracted to the polyion layer's polarity.

It is still another aspect of the present invention to provide a structure, as set forth above, in which additional film layers of polyion and lyotropic liquid crystal material may be added.

It is still a further aspect of the present invention to provide a structure, as set forth above, in which each film layer may have its own orientation as a result of shearing in that particular direction.

It is an additional aspect of the present invention to provide a structure, as set forth above, in which the polyion/lyotropic film may be used as an alignment layer for thermotropic liquid crystal materials.

The foregoing and other aspects of the present invention, which shall become apparent as the detailed description proceeds, are achieved by a lyotropic chromonic liquid crystal structure, comprising a substrate and at least one lyotropic chromonic liquid crystal surface film disposed on the substrate, the film comprising a polyion layer disposed on the substrate and a monomolecular lyotropic chromonic liquid crystal layer disposed on the polyion layer.

Still another aspect of the present invention is attained by a method for forming oriented monolayers of lyotropic chromonic liquid crystals, comprising the steps of providing a substrate, disposing a polyion layer on to the substrate, and disposing a monomolecular lyotropic liquid crystal layer on to the polyion layer.

Yet further aspects of the present invention are attained by a method for forming an aligned liquid crystal cell, comprising the steps of providing a pair of substrates, disposing a polyion layer on to each substrate, disposing a lyotropic liquid crystal layer on to each polyion layer, wherein the polyion layer and the liquid crystal layer form a film, positioning the lyotropic liquid crystal layers so that they face one another and provide a gap therebetween, and filling a thermotropic liquid crystal material into the gap.

These and other aspects of the present invention, as well as the advantages thereof over existing prior art forms, which will become apparent from the description to follow, are accomplished by the improvements hereinafter described and claimed.

BRIEF DESCRIPTION OF THE DRAWINGS

For a complete understanding of the objects, techniques and structure of the invention, reference should be made to the following detailed description and accompanying drawings, wherein:

FIGS. 17A–D are schematic representations of different optical components that can be constructed with the teachings of the present invention.

BEST MODE FOR CARRYING OUT THE INVENTION

A variety of approaches are presented herein that result in a uniform alignment of LCLC with a director that is not perpendicular to the substrate(s). The method, which is referred to as "surface film alignment," allows one to obtain an oriented dried monolayer stack or stacks of LCLC disposed on a substrate. Such a structure can be easily fashioned for use as a singular optical element (e.g., polarizer, color filter, retarder, etc.) or an integrated optical element (e.g., polarizing-color filtering-retarder, etc.).

Figure 1A:
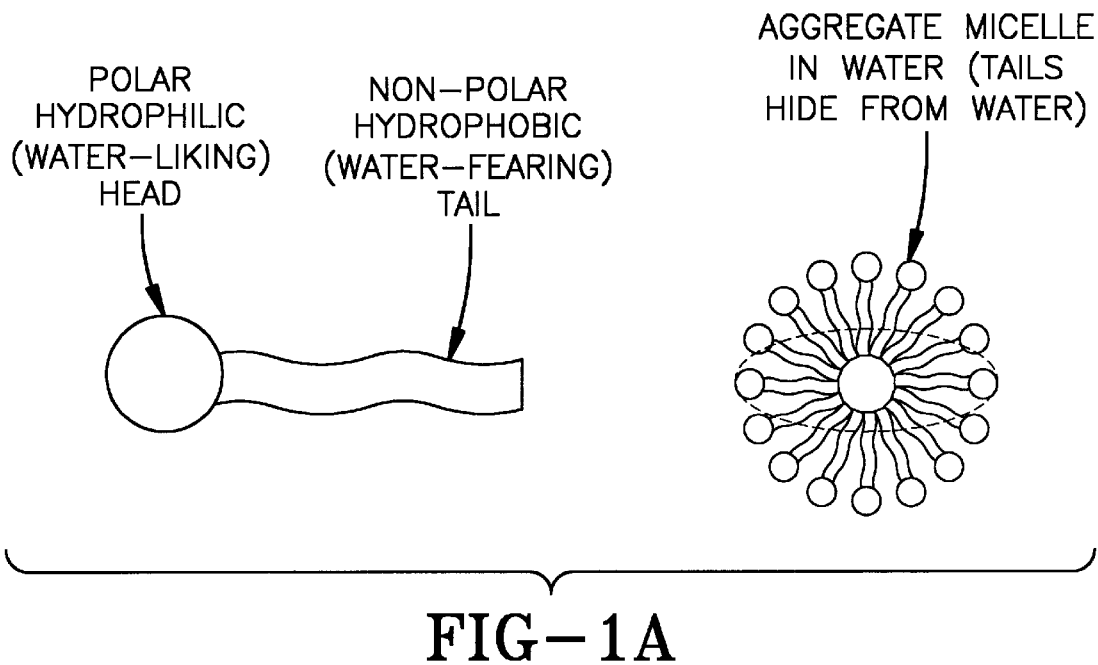
FIG. 1A is a schematic drawing of a surfactant lyotropic liquid crystal.
Figure 1B:
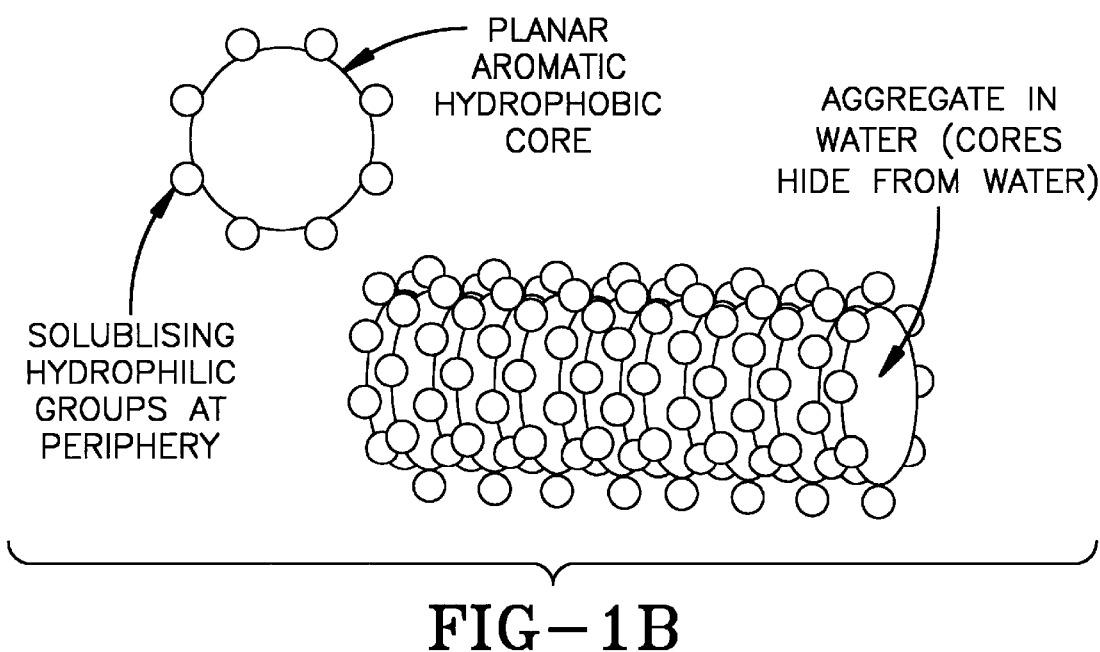
FIG. 1B is a schematic of a lyotropic chromonic liquid crystal.
Figure 2:
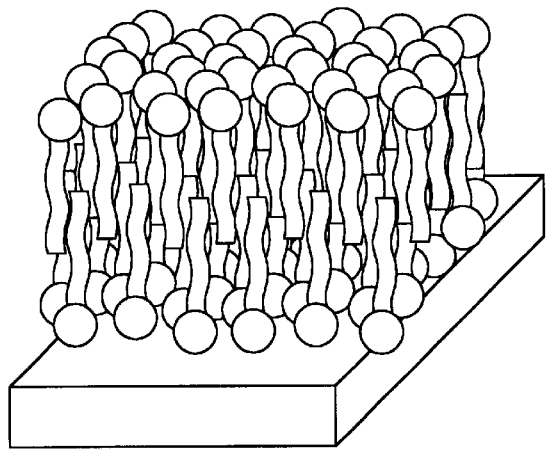
FIG. 2 is a schematic drawing of a Langmuir-Blodgett bi-layer.
Figure 3:
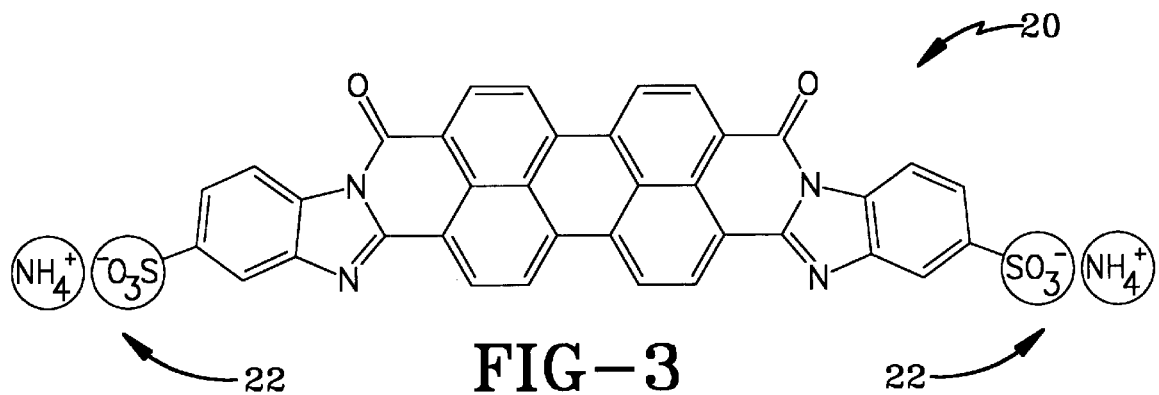
FIG. 3 is a chemical structure for a lyotropic chromonic liquid crystal, Violet 20.

Generally, a layer-by-layer deposition of polyions and materials that belong to the class of lyotropic liquid crystals is disclosed. As best seen in FIG. 3, an exemplary molecule of a preferred lyotropic chromonic liquid crystal is designated by the numeral 20. It is also necessary that LCLC chosen have molecules with pairs of ionic groups 22 at the opposite extremities. It is believed that the molecule 20 has a length of about 2.2 nm and a height of about 0.7 nm. As will become apparent from the following description, the corresponding electrostatic interactions fix the alternating stack of oppositely charged layers of polyions and LCLCs in the vertical direction. In the horizontal plane, stacking of aromatic cores of LCLC molecules provides the desired long-range orientational order.

Figure 4:
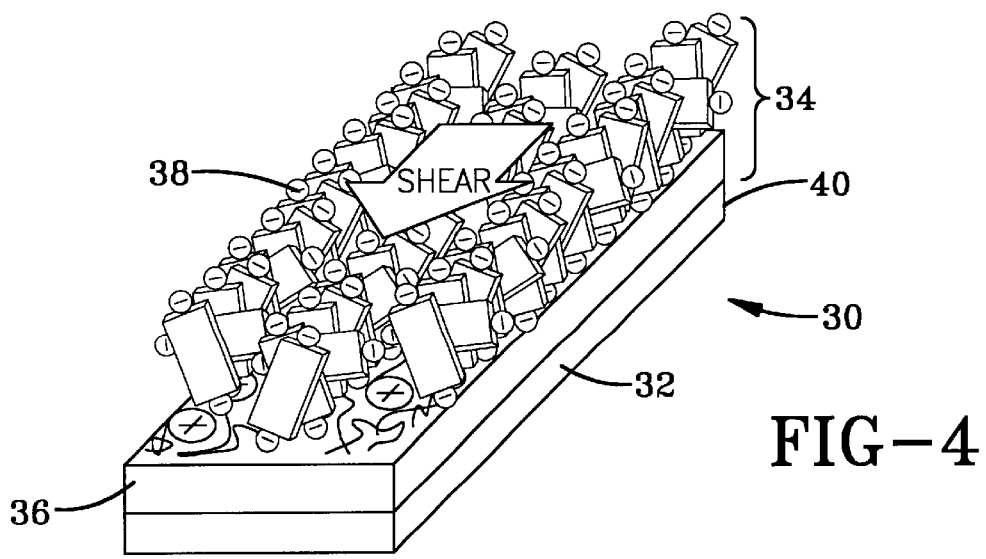
FIG. 4 is a top perspective view of a lyotropic chromonic liquid crystal and polyion bilayer film.

Referring now to FIG. 4, it can be seen that an exemplary surface film alignment structure is designated generally by the numeral 30. The substrate 32, which is generally made of a glass material (although other substrate materials such as plastic may be used), is treated to provide a polarity which is preferably negative. Selection of the polarity of the substrate is dependent upon the other materials which coact with one another to form the structure 30. At least one surface film 34 is disposed on the substrate 32, wherein each film 34 is made up of at least two layers of material. A first polyion layer 36 is disposed on the substrate 32 and is preferably made of a polymer material such as poly (diallyldimethyl) ammonium chloride (PDDA). Processing of this layer ultimately results in a material that has a positive polarity. Accordingly, after proper treatment of the substrate 32, which is negatively charged, the polyion layer 36 is attracted and adhered thereto. It should be noted that it is not necessary to have the first coating on the substrate 32 be a polyion. If one finds a suitable substrate that is oppositely charged to the LCLC, such as aminopropyltriethoxysilane-treated mica, which is positively charged for example, one may use that substrate and subsequently directly coat the dye on the bare substrate.

Once the polyion layer 36 is formed, a lyotropic chromonic liquid crystal material layer 38 is disposed thereon. In the preferred embodiment, the lyotropic chromonic liquid crystal material may be a range of dyes, drugs, nucleic acids, antibiotics, carcinogens, and anticancer agents. It has been found for this particular embodiment that a lyotropic chromonic liquid crystal material such as Violet 20 (V20), which has the formulation $C_{36}H_{22}N_6O_8S_2$ and is supplied by Optiva, Inc., may be used. The surface film 34 may be imparted with a shear 40 so as to impart a desired alignment thereto. This shear may be imparted by force in application of the polyion layer 36 and/or the lyotropic layer 38. Upon adsorption, the excess liquid crystal material is removed and the remaining material dries to leave an oriented layer.

Figure 5:
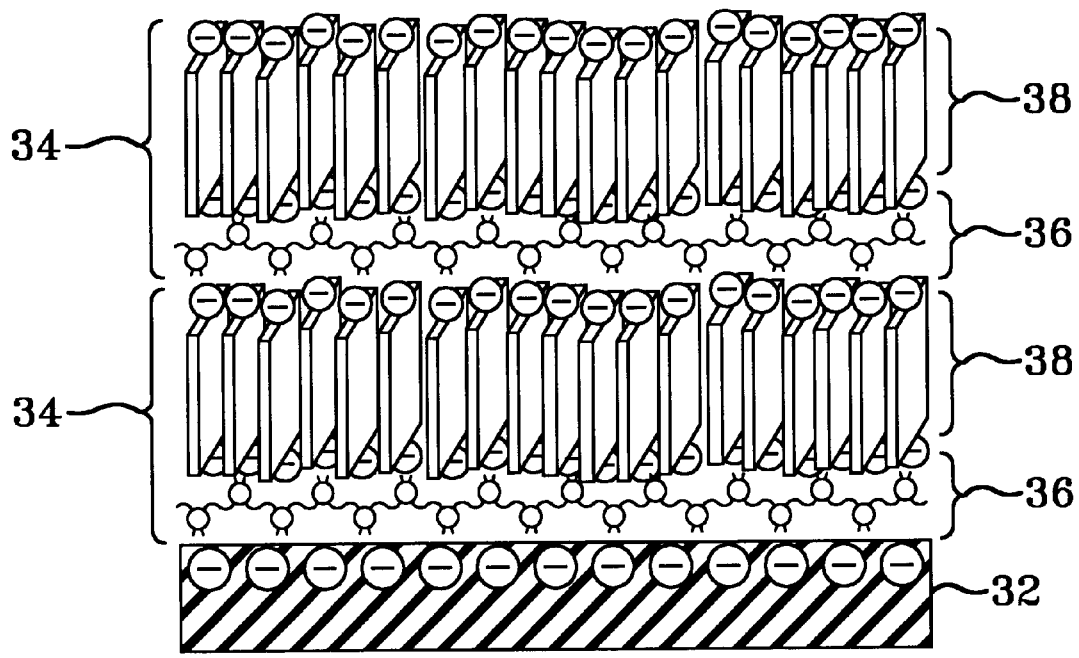
FIG. 5 is a schematic representation of a multilayer bilayer film.

As best seen in FIG. 5, a multi-film embodiment may be provided and is designated generally by the numeral 44. In particular, at least two films 34 may be disposed and layered on each other and wherein each layer may be sheared in a different direction, depending upon the particular end use of the structure desired.

Fixed in-plane orientation can be established within a monolayer or multilayer stacks of LCLC dye using the technique of alternate adsorption of oppositely charged polyions. This feat is accomplished by shearing (and thereby orienting) the dye in its nematic liquid crystalline phase onto the oppositely charged polyion substrate. In addition, it is possible to anisotropically-adsorb a nematic dye monolayer via the anisotropic anchoring interaction of the oppositely charged polyion.

In principle, it is possible to have embodiments where the polyion material is negatively charged and the liquid crystal material is positively charged. Here are some materials that might be used in either type of embodiment. These materials and the examples that follow should not be considered limiting.

Polyanion (positively charged polymer): poly (dimethydiallylammonium chloride), poly(ethylenimine), and poly(allylamine) hydrochloride Polycation (negatively charged polymer): poly (styrenesulfonate), poly(anilinepropanesulfonic acid), poly-(1-(4-(3-carboxy-4-hydroxyphenylazo)-benzenesulphonamido) 1,2-ethanediyl) sodium salt Anionic Dye Material: Thiacarbocyanine perchlorate Cationic Lyotropic Chromonic Liquid Crystal Material: Violet 20 ($C_{36}H_{22}N_6O_8S_2$), Blue 27 ($C_{28}H_{18}Cl_2N_4O_{10}S_2$), Red 14 ($C_{26}H_{18}N_6O_8S_2$), Disodium Cromoglycate ($C_{23}H_{14}Na_2O_{11}$)

In addition, it is also possible to have embodiments where no polyion material is necessary. In our current configuration, the polyion merely serves as "glue" to hold subsequent layers of LCLC together. One can envision a system of two LCLC materials in which the solubilizing groups at the periphery of A and B molecules are of opposite charges, respectively. In such an embodiment, molecule A would possess an overall negative charge whereas molecule B would possess an overall positive charge in aqueous solutions. The core hydrophobic structures of molecules A and B might be different, similar, or identical to each other. Without wanting to be bound by theory, it is believed that one could then simply absorb molecule A onto molecule B thereby eliminating the need for a polyion. This embodiment has yet to be realized but in principle is physically sound. Coulomb interactions between the oppositely charged molecules A and B would then stabilize the structure comprised, for example, a monolayer of molecules A on top of a monolayer of molecules B.

EXAMPLE 1

Surface Film Alignment of LCLC

To create oriented monolayers of LCLC, the following steps are performed. First, a liquid crystal composition is prepared by dissolving a sufficient amount of a lyotropic chromonic liquid crystal material in deionized water. The thermodynamically stable state of the material is thus the one with long-range orientational order both in the bulk and at the surfaces. Next, a substrate is prepared by covering it with a polyion. The polarity of the polyion is opposite to that of the charged chromonic molecules. The LCLC is then deposited on the substrate in a unidirectional manner. The LCLC direction is set by shear during deposition, or by shear depositing the polyion layer prior to deposition, or both. Next, the macroscopically thick LCLC layer is reduced to a monomolecular film by rinsing off the excess of LCLC with water. The exposed layer of dye molecules is locked by electrostatic interactions with an underlying oppositely charged polyion. More importantly, this layer inherits the in-plane orientational order intrinsic to the liquid crystalline nature of the LCLC deposition. And the above procedure may be repeated until the desired number of alternating polyion and dye layers is produced.

In aqueous solutions, the end groups of the dye V20 are negatively charged (see FIG. 3) as $NH_4^+$ becomes disassociated in water. The polyion that was used in this example is Poly(diallyldimethyl ammonium chloride) (PDDA; low MW, Aldrich). PDDA becomes positively charged in aqueous solution as $Cl^-$ disassociates in water. Ultrapure water with a specific resistance of better than or equal to 18.1 MΩ* cm was obtained by a Barnstead NANOpure analytical deionization system fed with house deionized water. Ultrapure water was used in all cases for making aqueous dye/polyion solutions and rinsing samples.

The method of making an exemplary structure 30 is as follows. A glass substrate is ultrasonically cleaned in an alkaline bath consisting of 5 g of KOH pellets, slowly dissolved into 30 g of ultrapure water, and 500 mL of Isopropanol for about an hour. This modifies the surface of the glass by essentially etching the surface layer away to expose a clean negatively charged glass surface. The substrate is then rinsed with ultrapure water for 30 seconds. After the rinse, the negatively charged substrate is placed into a 2 mg/mL aqueous solution of (positively charged) PDDA for 20 minutes. Once a layer of PDDA has been adsorbed onto the surface, the substrate is rinsed for 30 seconds with ultrapure water to remove excess polymer. The surface of the substrate now contains a positively charged monolayer and is ready to adsorb a negative material. An 8% (wt.) V20 aqueous solution was prepared such that the lyotropic liquid crystalline dye was in the nematic phase. Note that it is crucial that the dye be in an ordered liquid crystalline phase, as the shearing will align the dye aggregates in the flow direction. V20 was sheared onto the substrate using a ¼-inch wire-wound wet-film applicator rod (No. 3, Paul N. Gardner Co., Inc.). After a period of 5 minutes, a monolayer of dye is adsorbed onto the surface and the excess is then rinsed off with deionized water for 30 seconds. One may continue to layer the dye on by alternating with a positive polymer, negative dye, etc. until the desired number of dye layers is achieved.

Figure 9:
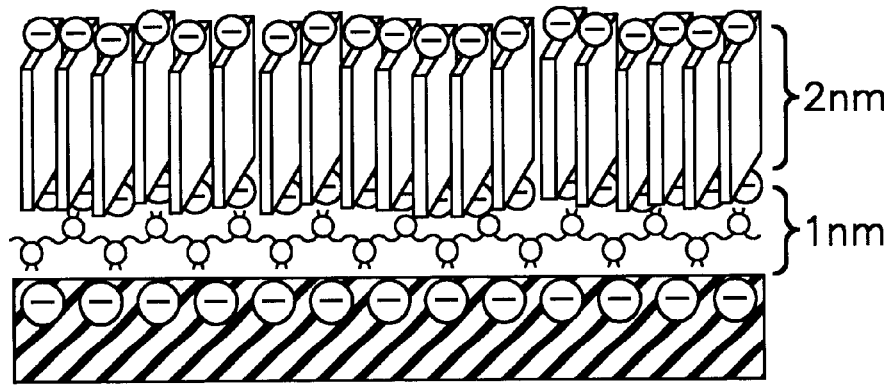
FIG. 9 is a schematic representation of a single bilayer film.
Figure 6:
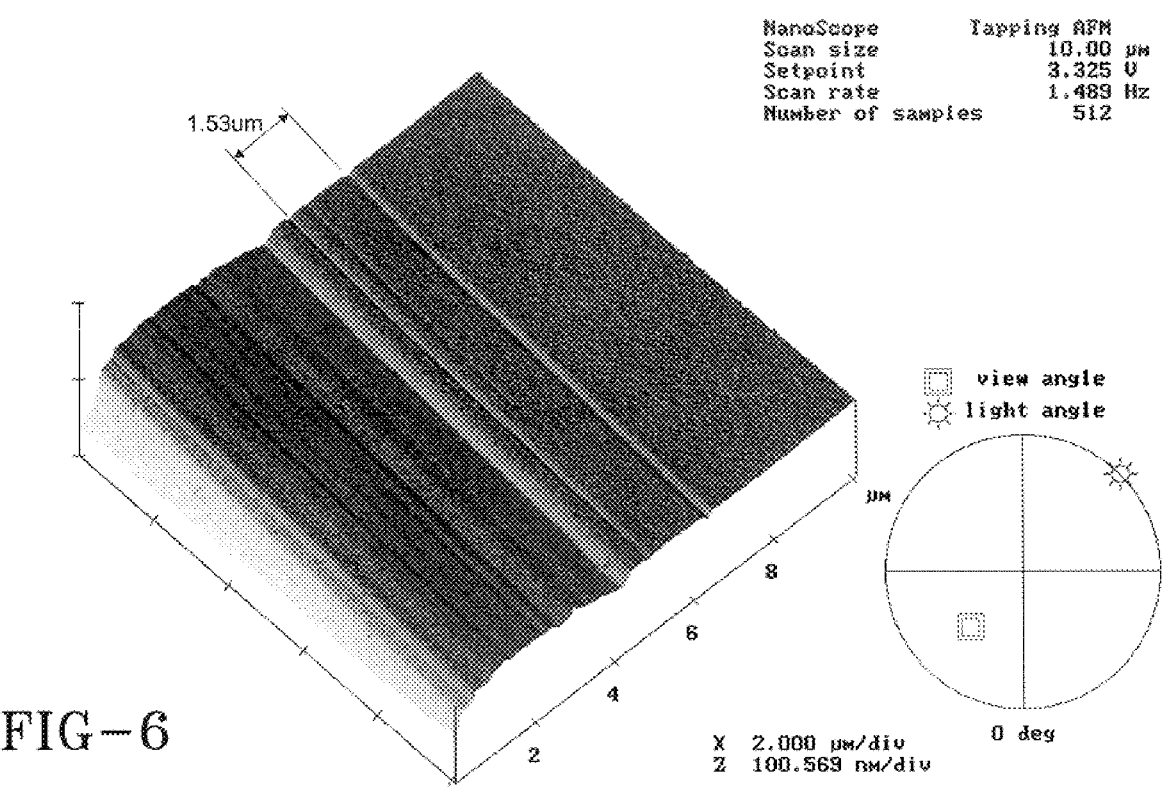
FIG. 6 is a microphotograph of an Atomic Force Microscopy (AFM) image of plain glass with a scratch where the area to the right of the scratch is left undamaged.
Figure 7:
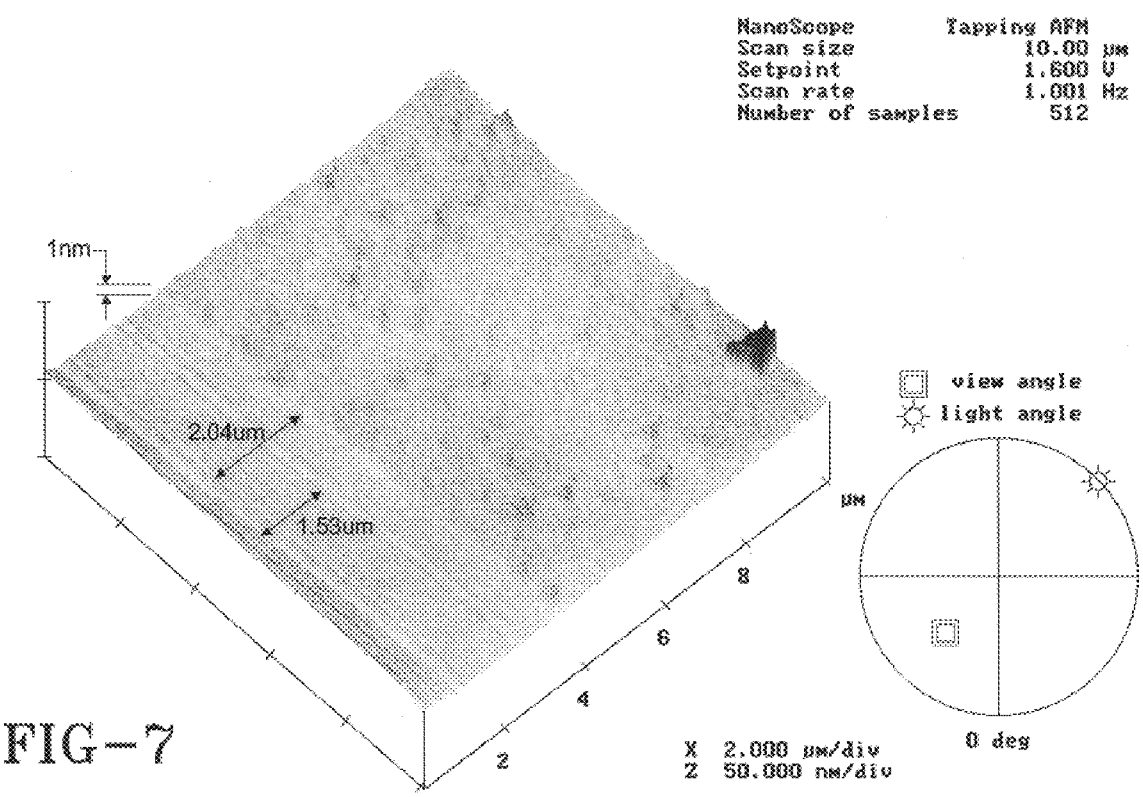
FIG. 7 is a microphotograph of an AFM image of scratched glass+PDDA, wherein the monolayer to the right of the scratch is about 1 nm high.
Figure 8:
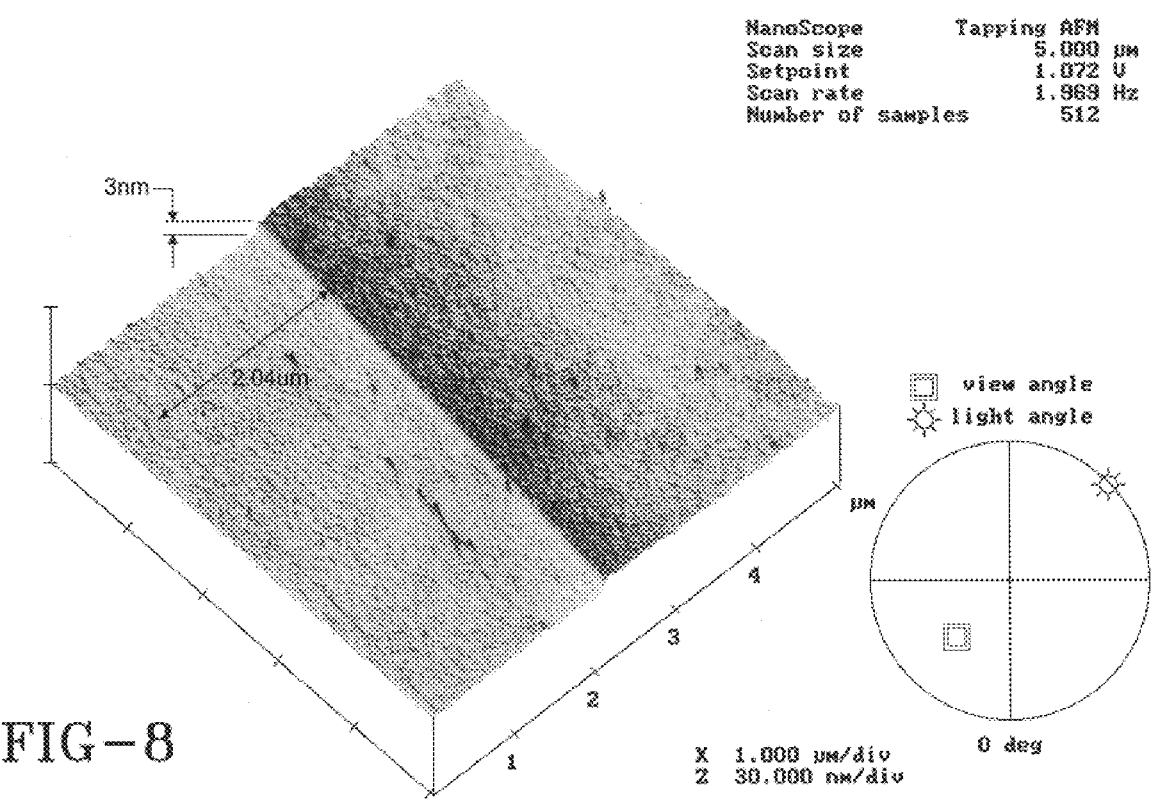
FIG. 8 is a microphotograph of an AFM image of scratched glass+PDDA+V20, wherein the dye-polyion bilayer to the right of the scratch is about 3 nm high.
Figure 10:
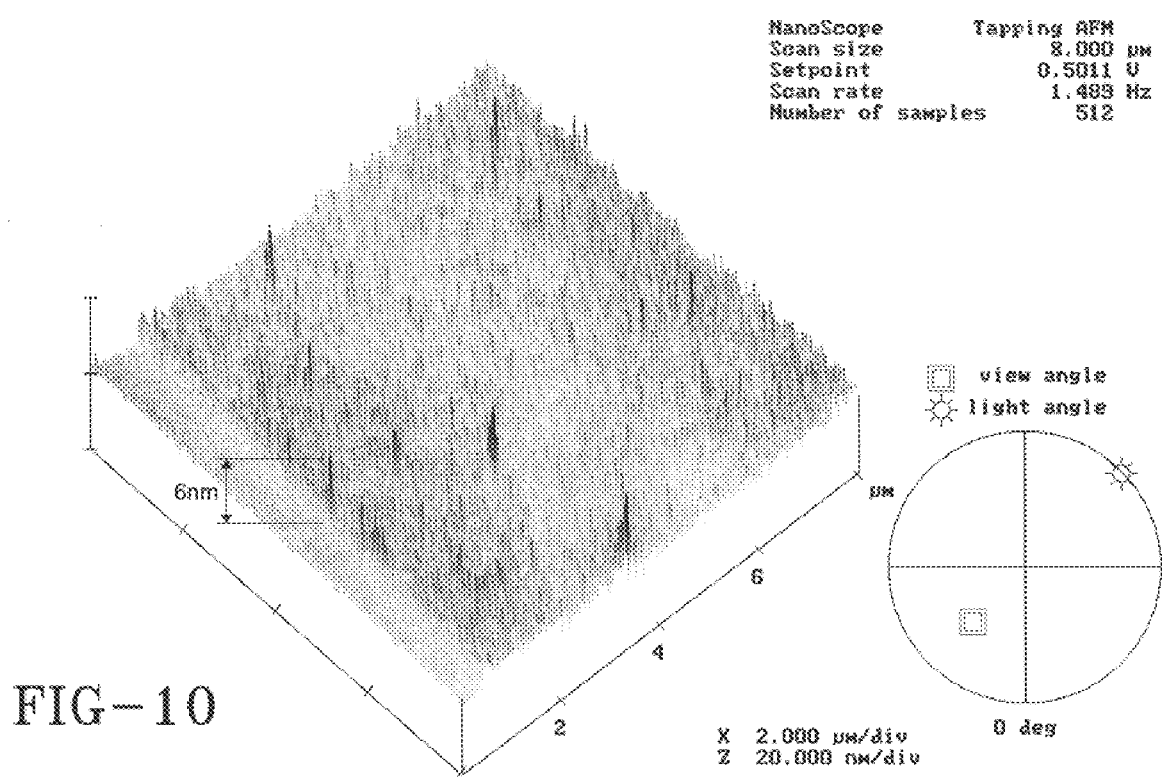
FIG. 10 is a microphotograph of an AFM image of scratched glass+PDDA+V20+PDDA+V20—such as shown in FIG. 5—wherein four layers to the right of the scratch are about 6 nm high.

To confirm that the dye was in-fact being adsorbed as a monolayer, Atomic Force Microscopy (AFM) was employed using Digital Instruments' NanoScope IIIa. Four samples were created using the prescription described in Example 1; one of cleaned plain glass (FIG. 6), one of glass+PDDA (FIG. 7), one of glass+PDDA+V20 (FIGS. 8 and 9), and one with glass+PDDA+V20+PDDA+V20 (FIGS. 10 and 5). All samples were scratched with the same razor and subsequently rinsed with deionized water. The samples were then examined under the AFM using the non-contact tapping mode. It can be seen in FIG. 6, there are two characteristic scratches created by the razor which are 1.53 µm apart. Note that the unscratched glass to the right is the same height as the glass in-between the two characteristic scratches. In FIG. 7, these two same scratches are evident. Therefore, the glass immediately to the left of the monolayer of PDDA can be taken as the true surface from which to measure. The thickness of the layer of PDDA is measured to be about 1 nm. A monolayer of PDDA is approximately 1 nm thick so the measured layer is in fact a monolayer. In FIG. 8, the glass immediately to the left of the PDDA+V20 layers can be taken to be the true surface as the distance from the one of the scratches to the double-layer is measured to be about 2.04 µm (the same distance as in FIG. 7). The PDDA+V20 layer thickness was measured to be about 3 nm. The plank-like dye molecule has a length of approximately 2 nm so the dye is believed to be standing on edge in the aggregate as the aggregate is adsorbed onto the Polymer monolayer as seen in FIG. 9. In FIG. 10, the thickness of the PDDA+V20+PDDA+V20 layers, schematically shown in FIG. 5, was measured to be about 6 nm, which is in agreement with the above measurements.

Figure 11:
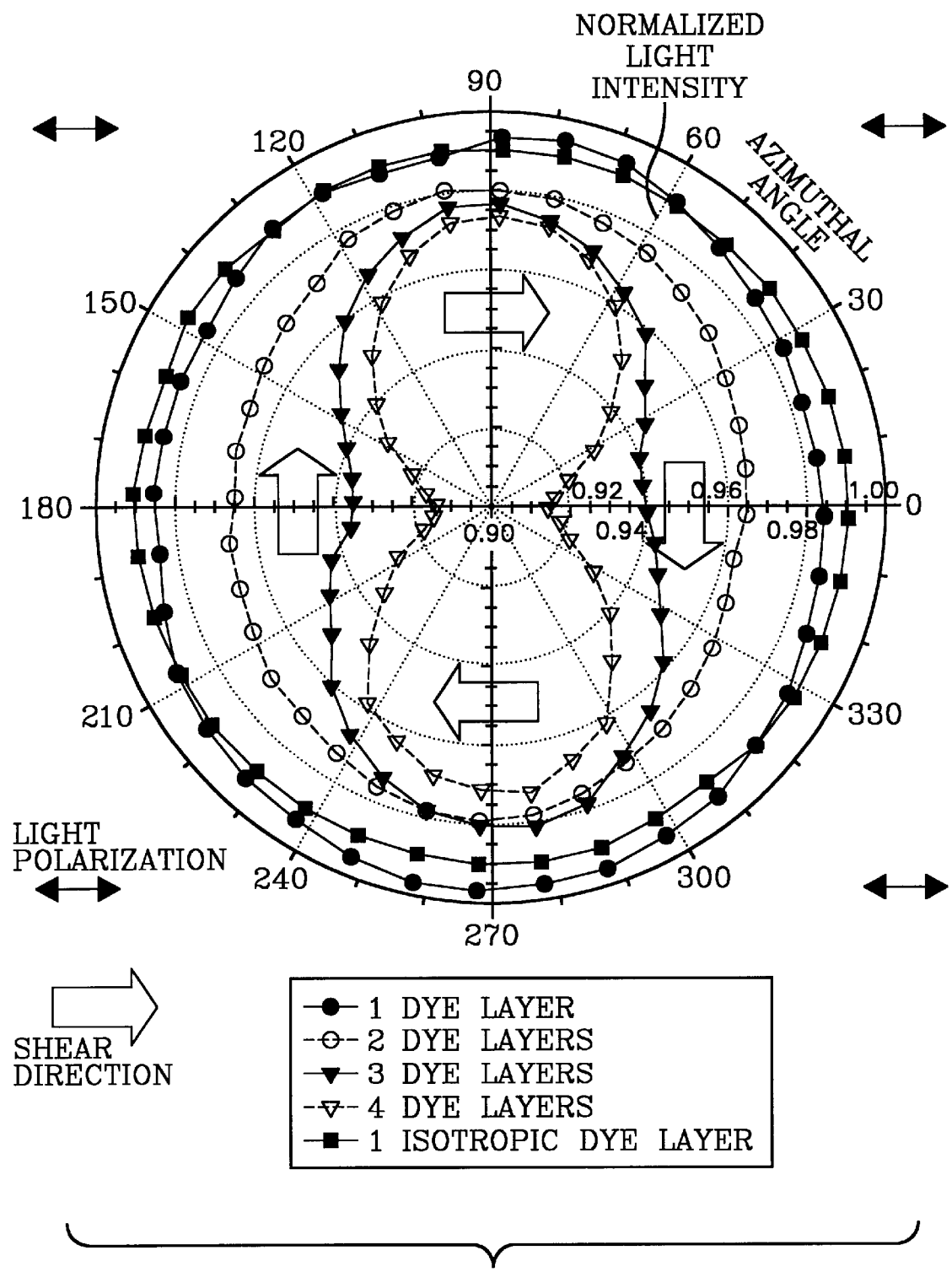
FIG. 11 is an azimuthal intensity map of polarized light passing through successive liquid crystal dye layers as a function of the angle between the light absorption axis of the liquid crystal dye and the polarization of incident light, and wherein the anisotropy of light absorption increases as the number of dye layers in the stack increases.

In-plane orientational order of the LCLC molecules manifests itself in the dependence of light absorption on the in-plane (azimuthal) angle between the polarization of normally incident light and the shear direction, see FIG. 11. A minimum of transmittance is achieved when the incident light polarization is parallel to the plane of the molecule. The symmetry of the pattern corresponds to a uniaxial in-plane orientational order. Note that the absorbance becomes more anisotropic as the number of absorbing V20 layers increases.

In FIG. 11, with only four oriented monolayers deposited, the overall transmission of light along the absorbing moment of the lyotropic chromonic material is still over 91% whereas the transmission of light along the transmitting moment of the material is about 97% normalized light intensity. This implies that the polarization efficiency for this extremely thin film polarizer is about 3.3%. It therefore becomes obvious that in order to make a useful optical device, multiple layers of oriented material must be used. For example from this data, one may extrapolate that it would take at least 100 monolayers of dye to make a "useful" polarizing film with an overall thickness of at least 300 nm.

EXAMPLE 2

Proof of Polyion Alignment Layer

Figure 12:
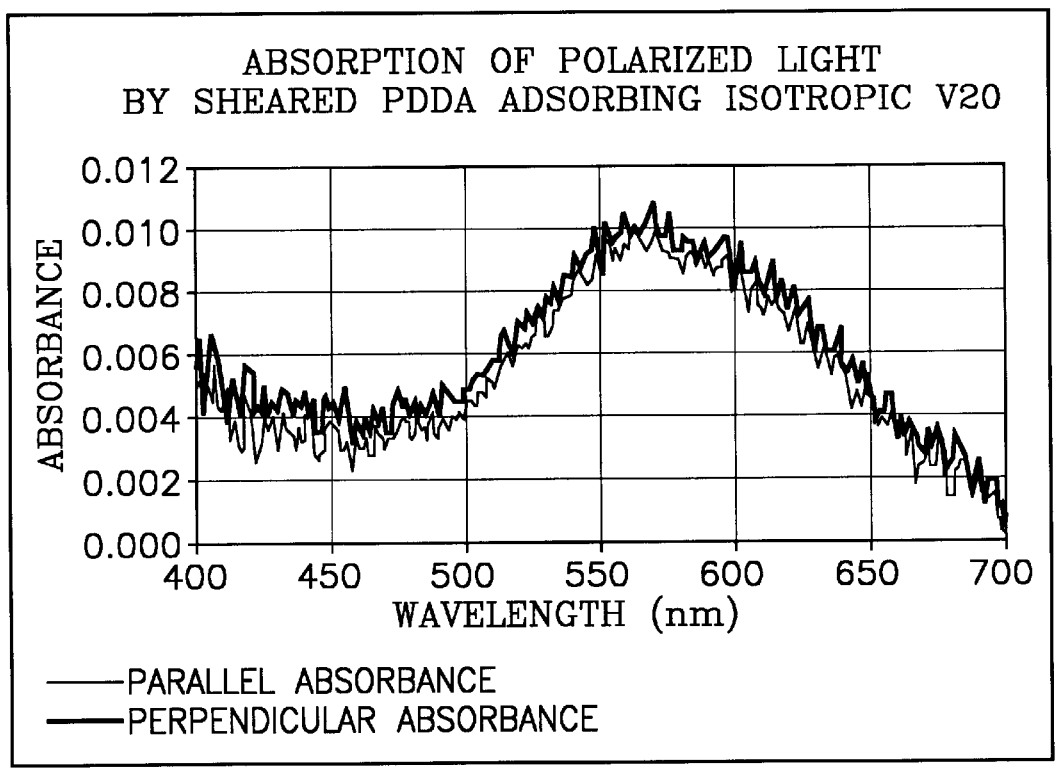
FIG. 12 is a graphical representation of an absorption spectrum of isotropic V20 deposited on sheared polyion.
Figure 13:
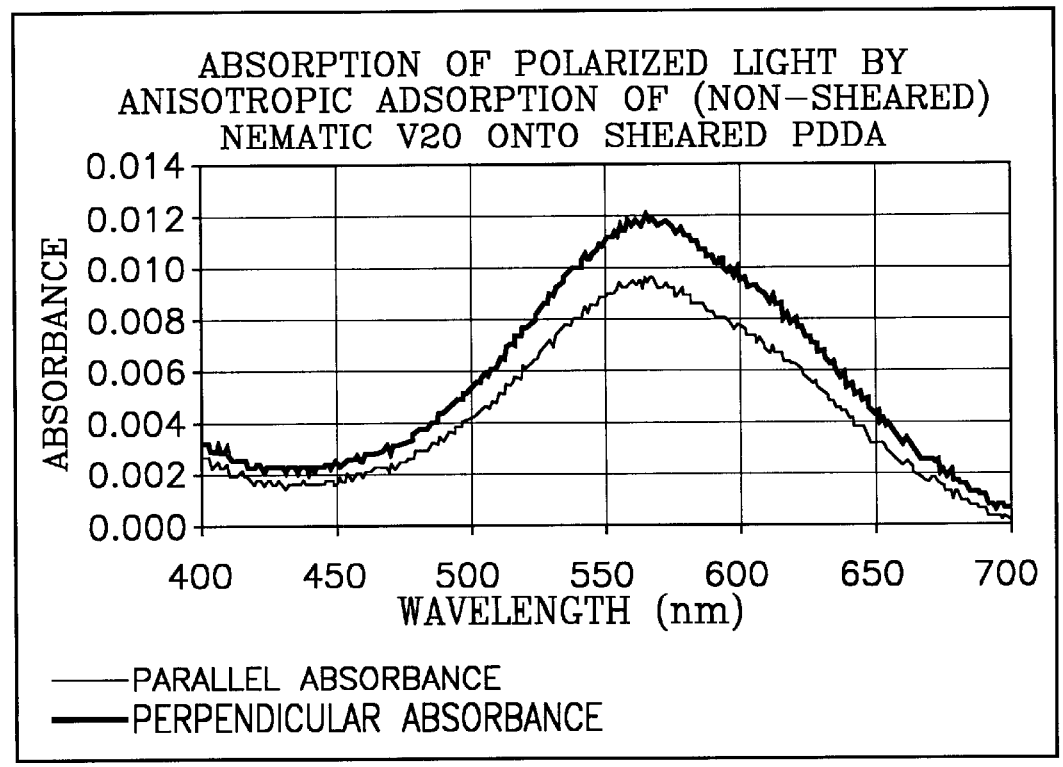
FIG. 13 is a graphical representation of an absorption spectrum of nematic V20 anisotropically adsorbed onto sheared polyion.
Figure 14:
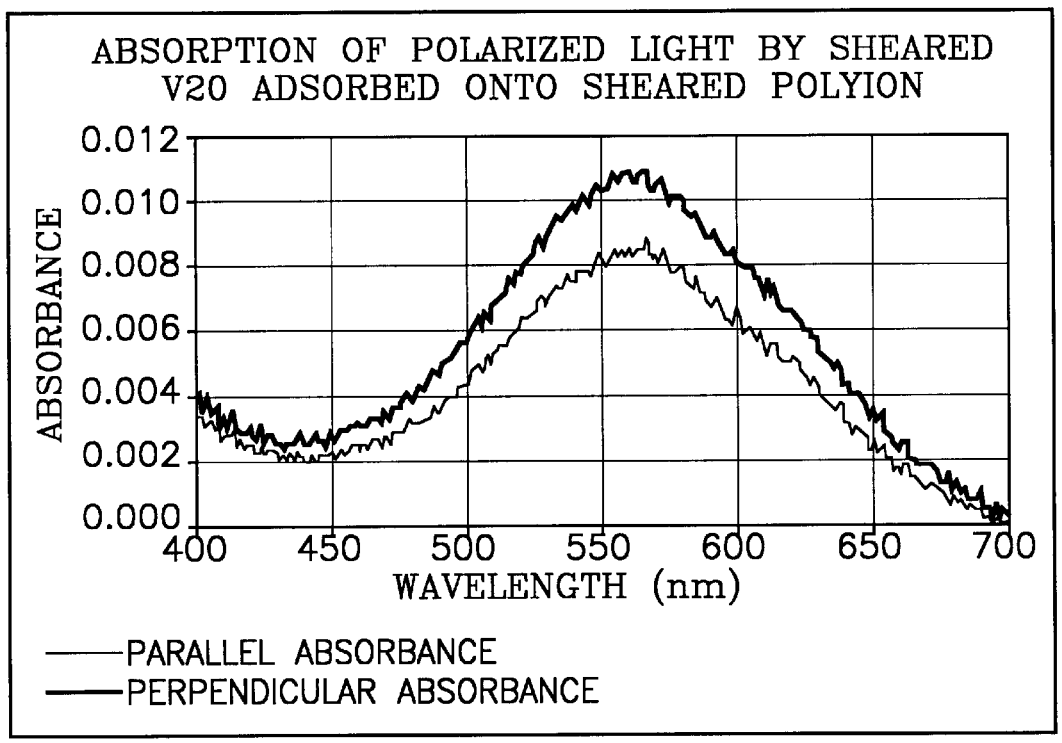
FIG. 14 is a graphical representation of an absorption spectrum of sheared nematic V20 deposited on sheared polyion.

Other investigations into the possibility of using the polyion layers as an alignment layer were made. Using a rubber squeegee, the polyion solution was sheared onto the substrate in a back and forth motion. Presumably, the polymer backbones of the polyion would align in the flow direction and adsorb onto the substrate anisotropically. This in-turn would provide some sort of anisotropic alignment layer for the dye as it was applied to the substrate. Three substrates were made with the "anisotropically" adsorbed PDDA in the same manner as described in Example 1. One substrate was dipped into an isotropic solution of V20 (see FIG. 12). The next substrate was dipped (normal to the surface of the glass—so as not to introduce any preferential direction) into a nematic solution of V20 (see FIG. 13). The third substrate was sheared with a nematic solution of V20 (see FIG. 14). It was found that the isotropic solution of dye was not absorbed anisotropically. This is because the dye must be in an elongated aggregate nematic phase for the anisotropic anchoring interaction to take place. Supporting evidence was found in the second sample, which exhibits anisotropic light absorption indicating an anisotropic adsorption of dye onto the substrate. As expected in the third sample, the sheared V20 was anisotropic as before.

COUNTER EXAMPLE 3

Necessity of the Liquid Crystalline Phase

It is important to note that the phase of the dye and the deposition method are of course, crucial to the resulting film. In order to achieve orientation of the LCLC, it should be sheared onto the polyion substrate while in the liquid crystalline phase. A sample was created in the same manner as Example 1; however, the isotropic phase of V20 was sheared onto the polyion substrate, rather than the liquid crystalline phase of V20. In FIG. 11, it is obvious that this substrate exhibits no anisotropy in the absorption of light. The dye, being pleochroic in nature, will exhibit anisotropy in the absorption of light only after it has been uniformly oriented. Therefore, the dye must be in an elongated aggregate nematic phase so that shear flow can induce alignment.

COUNTER EXAMPLE 4

Proof of Dye Adsorption onto Oppositely Charged Substrate

An experiment was devised in which the surface layer of polyion was of the same charge as the dye to illustrate that the dye is adsorbed onto the polyion substrate, rather than dye diffusion into the polymer as the polymer swells. All spectroscopic measurements were made with a Perkin-Elmer Lambda 18 spectrometer in the visible spectrum. In this experiment, four samples were prepared from a glass substrate, which was cleaned as described in Example 1. Note that all of the samples were thoroughly rinsed with ultrapure water after the adsorption had taken place in order to wash off excess material. The substrate is prepared as in Example 1 above, where, after adsorbing a layer of PDDA, the substrate is dipped either into a 3 mg/mL aqueous solution of Poly(sodium 4-styrenesulfonate) (PSS; MW=1M, Aldrich) for 20 minutes to adsorb a negative polyion layer or an 8% aqueous solution of V20 to adsorb a negative dye layer. Note that PSS becomes negatively charged in aqueous solution as $Na^+$ disassociates in water. The samples were as follows: a pure glass substrate, one with glass+PSS+V20, one with glass+PDDA +PSS+V20, and one with glass+PDDA+V20.

Figure 15:
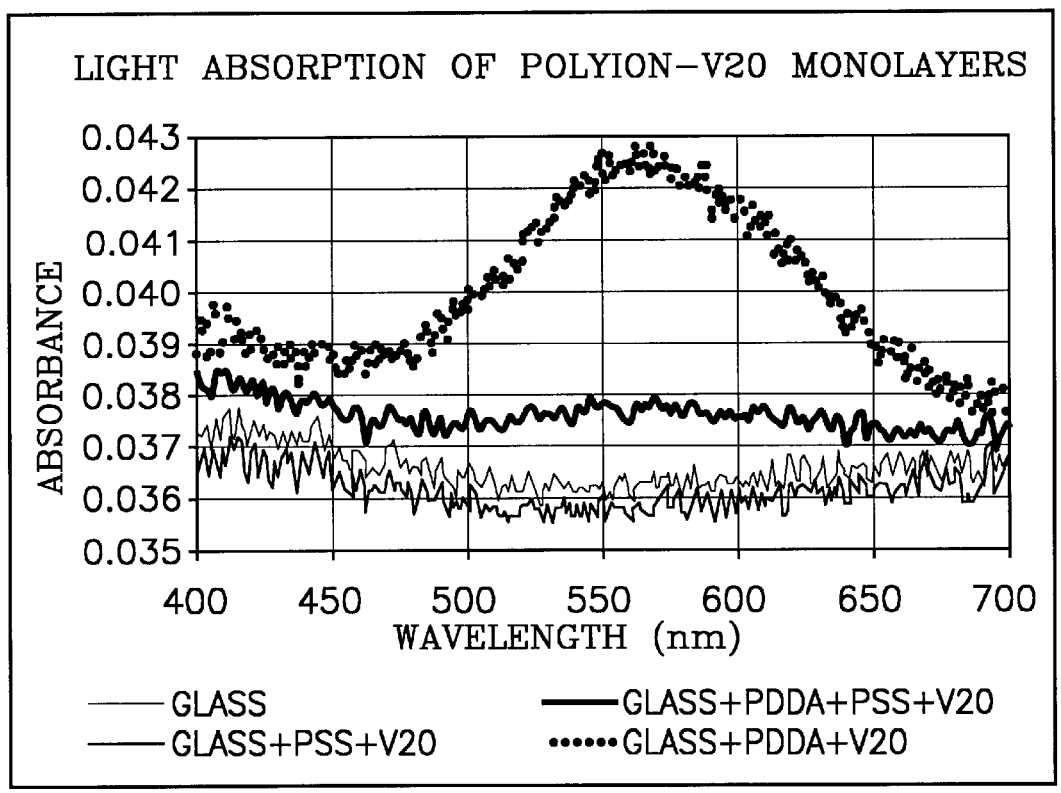
FIG. 15 is a graphical representation of an absorption spectrum that provides proof of the surface adsorption of the LCLC onto the oppositely charged substrate, wherein it is noted that the only sample exhibiting strong light absorption is the glass+PDDA+V20 samples, and wherein V20 will not adsorb onto a like-charged surface such as plain glass or glass+PDDA+PSS.

The spectra of these samples appear in FIG. 15. From these spectra, it is seen that no light absorption came from the glass and glass+PSS+V20 samples. Hence, no dye was adsorbed onto these substrates as the glass, PSS, and V20 are all negatively charged. The glass+PDDA+PSS+V20 sample shows some slight light absorption probably due to diffusion of the aqueous dye solution into the polymers as the polymers swell. This "swelling" absorption can be considered negligible when compared to the much higher light absorption of the glass+PDDA+V20 sample. This clearly establishes that the adsorption mechanism is in fact due to the electrostatic charges of the materials and not diffusion during swelling of the polymer. In addition, PSS is not needed in the assembly of polyion and dye monolayer stacks as it is of the same charge as the LCLC dye.

EXAMPLE 5

Optical Components Or Further Implementations From Surface Film Alignment

Figure 16:
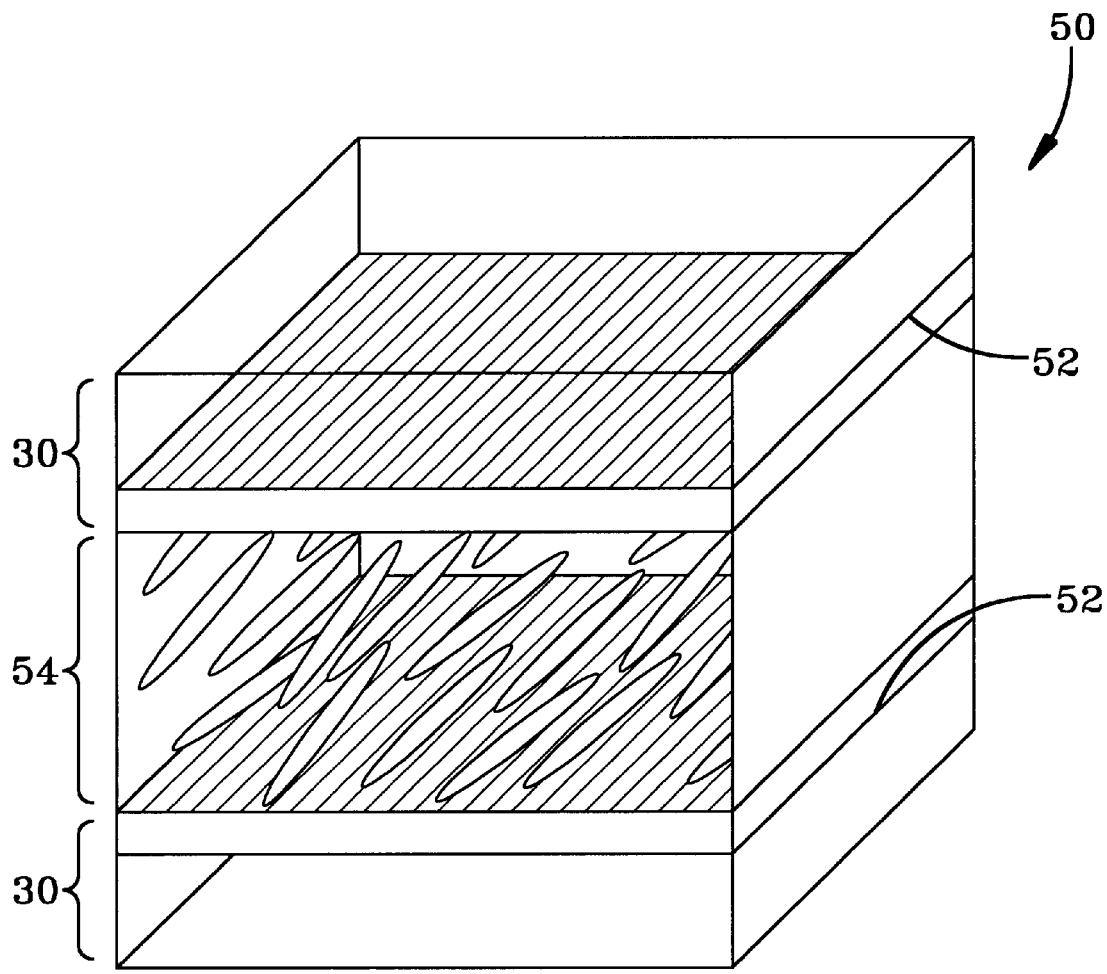
FIG. 16 is a schematic representation of an LCLC alignment layer used to align thermotropic liquid crystal materials.

The structure 30 may be employed as an alignment layer for thermotropic liquid crystal materials. As best seen in FIG. 16, a cell, designated generally by the numeral 50, may be provided. The cell 50 includes a pair of opposed structures 30 which may or may not be provided with corresponding electrodes 52. A thermotropic liquid crystal material 54 is disposed between the structures 30 and may be aligned according to the features imparted to the structures 30. Accordingly, the structures 30 may be rubbed in any number of directions so as to affect the liquid crystal material 54 disposed therebetween. Use of the electrodes allows for providing a display of the desired thermotropic liquid crystal material in a manner dependent upon its particular operational characteristics. The long-range orientation intrinsic to the LCLC is defined within the plane during shear deposition of the LCLC. In establishing in-plane orientation within the monolayer, one is able to manipulate the optical axis of the system in subsequent layers to create any number of useful geometries for practical optical devices. In addition, a substrate with a stack of dried LCLC monolayers obtained by the "surface film alignment" technique can also be used as a substrate to align the bulk of a thermotropic liquid crystal. In this case, the "surface film alignment" substrates are used as the bounding plates for the thermotropic liquid crystal where the thermotropic is in direct contact with the LCLC.

These examples should not be limited to singular functional optical device. One might envision so-called integrated optical devices where multiple functionality of the resulting multilayered stacks could be realized as a combination of any of the aforementioned devices in subsequent multilayered stacks. Such an optical component could be manufactured by a continuous fabrication process. It is envisioned that this process would be implemented on a conveyor system wherein a substrate is placed on a turntable. Starting out, the substrate would be rinsed with water as described above. Next, a roller would apply and shear a layer of PDDA onto the substrate which is then rinsed again with water. Following this, a nitrogen stream is applied to the substrate and another roller applies and shears a layer of LCLC onto the layer of PDDA. Water then rinses the assembly again. It will be appreciated that the rotation of the rollers is at a rate faster than the speed of the conveyor to induce shear operation. Upon completion of the rinsing step, the turntable may be slightly rotated and the above process steps are repeated until the stacked component with the desired number of layers is completed. And, as noted previously, selection of LCLC materials with different polarities may eliminate the need for the polyion layers.

The above process can be used to make any number of optical components as seen in FIGS. 17A–D. It should be noted that different absorbing or non-absorbing lyotropic chromonic materials might be used in multilayered stacks of monolayers to achieve an optical device. An example of a lyotropic chromonic liquid crystalline material that does not absorb visible light would be Disodium Cromoglycate (DSCG).

FIG. 17A shows a color filter designated generally by the numeral 70. The filter 70 employs any number of layers of polyion layers 72 and isotropic phase LCLC layers 74 on a substrate 76 which provides no orientation for the absorbing axis. In the color filter 70, the absorbing (visible light) chromonic material is in the isotropic (non-ordered) state when it is deposited during the manufacturing process. Hence, films made from the isotropic phase material absorb all polarization states of light uniformly and only transmit light of the wavelengths that the material does not absorb.

For many optical devices one would need to stack monolayers of lyotropic chromonic materials with an in-plane axis of orientational order that changes direction in any prescribed fashion from one monolayer to another or from one group of monolayers to another group. Multiple oriented monolayers of such a stacked material might be used in band-gap filters where orientation of the optical axis every 200 layers, for example, is alternated by 90 degrees to create a uniform modulation in the optical index of the film every 600 nm. Note that in the band-gap filter application, the thickness of the optically birefringent materials may be controlled precisely from multilayer to multilayer allowing the multilayers to be spectrally tunable. In essence, one might tune the multilayered stack thickness to the particular wavelength or wavelengths of interest. In addition, one might slightly rotate the optical axis of one particular multilayer stack with respect to another (so they are not necessarily mutually perpendicular) to create polarization dependent band-gap filters of specific wavelengths or multiple (continuous) wavelengths.

One may spectrally tune the films by simply using a different absorbing lyotropic chromonic material. For example, one might use Violet 20 which exhibits maximum absorption of light around 570 nm or Blue 27 which exhibits maximum absorption of light around 650 nm. Combining these two dyes in one film of multiple layers and controlling the proportion of one material over the other might enable one to tune the overall color of the film from say violet to blue.

FIG. 17B shows a band-gap filter designated generally by the numeral 80 which includes a first stack 82 of monolayer films 83, interleaved with polyion layers 84, and a second stack 85 of monolayer films 86 also interleaved with polyion layers 84. Any number of stacks could be provided on a substrate 88 depending upon the end application. It will be appreciated that the orientation of the films is the same throughout a stack and that the direction of orientation between adjacent stacks may or may not be the same. The number of films in a stack corresponds to the wavelength of light to be filtered or reflected. In one example, the band-gap filter may be constructed so that the optical axes of the two non-absorbing chromonic materials in the film are oriented to be mutually perpendicular. Each multilayered stack of the respective materials is at a certain thickness determined by the specific optical wavelength to be reflected. There are perhaps hundreds of monolayers within each multilayer stack and perhaps tens of multilayered stacks of each material within the filter. Hence, to create an effective band-gap filter, the resulting monolayers should number in the thousands.

FIG. 17C shows a polarizer designated generally by the numeral 90. The polarizer 90 employs any number of polyion layers 92 and sheared nematic phase LCLC layers 94 on a substrate 96 at least the layers 94 are sheared in the same direction. The polarizer may have the absorbing chromonic material oriented uniformly in one direction throughout 100 or more layers.

FIG. 17D shows a compensator designated generally by the numeral 100. The compensator 100 has a top LCLC layer 102 sheared in the plane of the paper. Successive LCLC layers 104, 106, 108—with interposed polyion layers 109— twist out of the plane so the bottom layer 108 is sheared normal to the paper. The bottom layer 108 is in contact with a thermotropic liquid crystal material 110 that may be bounded by a substrate 112 and functions as an alignment layer. This integrated optical device could be used in a polarizing-compensating-alignment multilayered stack for a TN cell. In such a device, the film would function simultaneously as an optical polarizer, optical compensator for the thermotropic liquid crystalline structure captured between substrates, and alignment layer for the thermotropic liquid crystal which would be in direct contact with the LCLC in the TN cell. The compensator optically compensates for the birefringence of the thermotropic material. For example, using DSCG, one might be able to make an optical compensator for a normally black mode twisted-nematic (TN) liquid crystalline cell. This could be accomplished by simply rotating the shearing direction of the chromonic material in subsequent layers as one progresses through the stacks to reverse-mimic the optical axis structure of the thermotropic liquid crystal within the TN cell.

Thus, it can be seen that the objects of the invention have been satisfied by the structure and its method for use presented above. While in accordance with the Patent Statutes, only the best mode and preferred embodiment has been presented and described in detail, it is to be understood that the invention is not limited thereto or thereby. Accordingly, for an appreciation of the true scope and breadth of the invention, reference should be made to the following claims.

What is claimed is:

1. A lyotropic chromonic liquid crystal structure, comprising:
    a substrate; and
    at least one surface film disposed on said substrate, said film comprising a polyion layer disposed on said substrate and a monomolecular lyotropic chromonic liquid crystal layer disposed on said polyion layer.

2. The structure according to claim 1, wherein said lyotropic chromonic liquid crystal layer is sheared in one direction on to said polyion layer to produce a fixed in-plane orientation of the lyotropic chromonic liquid crystal layer in a desired direction.

3. The structure according to claim 1, wherein said polyion layer is positively charged when disposed on said substrate from aqueous solution.

4. The structure according to claim 3, wherein said polyion layer has a polarity in aqueous solutions that is opposite to the polarity of said monomolecular lyotropic chromonic liquid crystal layer.

5. The structure according to claim 3, wherein said substrate is negatively charged to attract said polyion layer.

6. The structure according to claim 3, wherein said monomolecular lyotropic liquid crystal layer is a lyotropic chromonic liquid crystal that has negatively charged groups at the periphery of the molecules, wherein one of said ends is attracted to said polyion layer.

7. The structure according to claim 3, wherein said polyion layer is selected from the group consisting of poly(diallydimethyl ammonium chloride), poly (ethylenimine), and poly(allyamine) hydrochloride.

8. The structure according to claim 1, further comprising:
    additional layers of surface films disposed on said at least one surface film, wherein each additional film comprises an additional polyion layer disposed on a previously formed monomolecular lyotropic liquid crystal layer and an additional monomolecular lyotropic liquid crystal layer disposed on said additional polyion layer.

9. The structure according to claim 8, wherein any of said at least one and additional layers of monomolecular lyotropic liquid crystal layers are sheared in any number of directions on to said adjacent polyion layer.

10. The structure according to claim 9, wherein said polyions layers are oppositely charged to the said monomolecular lyotropic liquid crystal layers.

11. A method for forming oriented monolayers of lyotropic chromonic liquid crystals, comprising:
    providing a substrate;
    disposing a polyion layer on to said substrate; and
    disposing a monomolecular lyotropic liquid crystal layer on to said polyion layer.

12. The method according to claim 11, further comprising:
    shearing said monomolecular lyotropic chromonic liquid crystal layer to orient molecules of said lyotropic chromonic liquid crystal material uniformly.

13. The method according to claim 11, further comprising:
    shearing said polyion layer prior to disposing said monomolecular lyotropic chromonic liquid crystal layer to orient molecules of said monomolecular lyotropic liquid crystal material uniformly.

14. The method according to claim 11, further comprising:
shearing said polyion layer prior to disposing said monomolecular lyotropic liquid crystal layer to orient molecules of said monomolecular lyotropic liquid crystal material uniformly; and
shearing said monomolecular lyotropic liquid crystal layer, both said shearing steps orienting molecules of said monomolecular lyotropic liquid crystal material uniformly.

15. The method according to claim 11, further comprising:
a) disposing another polyion layer on a previously disposed monomolecular lyotropic liquid crystal layer; and
b) disposing another monomolecular lyotropic liquid crystal layer on said another polyion layer.

16. The method according to claim 15, wherein shearing said another polyion layer and/or said another monomolecular lyotropic liquid crystal layer to orient molecules of said monomolecular lyotropic liquid crystal material uniformly.

17. The method according to claim 15, further comprising:
repeating steps a) and b) until a desired optical effect is obtained.

18. The method according to claim 11, further comprising:
a) disposing another polyion layer on a previously disposed monomolecular lyotropic liquid crystal layer;
b) disposing another monomolecular lyotropic liquid crystal layer on said another polyion layer; and
c) shearing said another polyion layer and/or said another monomolecular lyotropic liquid crystal layer to orient molecules of said monomolecular lyotropic liquid crystal material uniformly, wherein each said layer of monomolecular lyotropic liquid crystal material is sheared in a predetermined direction.

19. The method according to claim 18, wherein said layers of monomolecular lyotropic chromonic liquid crystal are sheared in different directions.

20. The method according to claim 18, wherein said layers of polyion are sheared in different directions.

21. A method for forming an optical component, comprising:
providing at lease one substrate;
disposing a polyion layer on said substrate; and
disposing a lyotropic chromonic liquid crystal layer on to said polyion layer, wherein said polyion layer and said liquid crystal layer form a film.

22. The method according to claim 21, wherein said polyion layer is about the thickness of the polyion molecule.

23. The method according to claim 21, wherein said monomolecular liquid crystalline layer is about the thickness of the lyotropic chromonic liquid crystalline molecule.

24. An optical component, comprising:
a substrate; and
a plurality of films disposed on said substrate, wherein each of said plurality of films includes at least one layer of in-plane oriented monomolecular lyotropic chromonic liquid crystal material.

25. The component according to claim 24, wherein said plurality of films comprise alternating layers of a positively charged monomolecular lyotropic chromonic liquid crystal material adjacent a negatively charged monomolecular lyotropic chromonic liquid crystal material.

26. The component according to claim 25, wherein said alternating layers are oriented in a same direction.

27. The component according to claim 25, wherein said alternating layers are oriented in a different direction.

28. The component according to claim 24, wherein said plurality of films comprise alternating layers of a polyion material and said monomolecular lyotropic chromonic liquid crystal material.

29. The component according to claim 24, wherein said monomolecular lyotropic chromonic liquid crystal material is in its isotropic phase and, depending upon the number of films, absorbs all polarizations of light in the selected part of the optical spectrum, to form a color filter.

30. The component according to claim 24, wherein said plurality of films are oriented uniformly in one direction to form a polarizer.

31. The component according to claim 24, wherein said plurality of films have different orientations to rotate the optical axis, and wherein the optical component further comprises:
a twisted nematic cell adjacent said substrate, wherein the birefringence of said twisted nematic cell is optically compensated by said plurality of films.

32. The component according to claim 24, wherein said plurality of films are segmented into at least two stacks, said first stack having a predetermined thickness to reflect a desired wavelength, and said second stack having a different predetermined thickness to reflect a different desired wavelength; and
wherein the orientation of said adjacent stacks are different from each other.

* * * * *